(12) United States Patent
Fenton et al.

(10) Patent No.: US 6,978,839 B2
(45) Date of Patent: Dec. 27, 2005

(54) INTERNAL CONNECTION OF TREE TO WELLHEAD HOUSING

(75) Inventors: Stephen Paul Fenton, Houston, TX (US); Francisco Dezen, Houston, TX (US); Lars-Petter Sollie, Houston, TX (US); Jon E. Hed, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 132 days.

(21) Appl. No.: 10/300,195

(22) Filed: Nov. 20, 2002

(65) Prior Publication Data

US 2003/0094284 A1 May 22, 2003

Related U.S. Application Data

(60) Provisional application No. 60/425,377, filed on Nov. 12, 2002, provisional application No. 60/332,116, filed on Nov. 21, 2001.

(51) Int. Cl.⁷ .................. E21B 33/047; E21B 33/043
(52) U.S. Cl. ............... 166/348; 166/368; 166/336; 166/337; 166/86.1
(58) Field of Search ................ 166/336, 337, 166/348, 368, 86.1, 87.1

(56) References Cited

U.S. PATENT DOCUMENTS

| | | | |
|---|---|---|---|
| 3,163,223 A | 12/1964 | Bauer et al. | |
| 3,279,536 A | 10/1966 | Wakefield, Jr. | |
| 3,454,084 A * | 7/1969 | Sizer | 166/335 |
| 3,521,909 A | 7/1970 | Brown | |
| 3,685,580 A * | 8/1972 | De Vries | 166/368 |
| 3,850,237 A * | 11/1974 | Ahlstone et al. | 166/336 |
| 3,974,875 A | 8/1976 | Herd et al. | |
| 4,893,842 A | 1/1990 | Brammer | |
| 5,145,006 A * | 9/1992 | June | 166/341 |
| 5,222,560 A * | 6/1993 | Brammer et al. | 166/344 |
| 5,366,017 A * | 11/1994 | Voss, Jr. | 166/368 |
| 5,544,707 A | 8/1996 | Hopper et al. | |
| 5,769,162 A * | 6/1998 | Bartlett et al. | 166/87.1 |
| 5,775,427 A | 7/1998 | Skeels et al. | |
| 5,873,415 A * | 2/1999 | Edwards | 166/344 |
| 6,186,237 B1 * | 2/2001 | Voss et al. | 166/337 |
| 6,367,551 B1 * | 4/2002 | Fenton | 166/345 |
| 6,378,613 B1 * | 4/2002 | Kent et al. | 166/368 |
| 6,497,277 B2 * | 12/2002 | Cunningham et al. | 166/95.1 |
| 2003/0150620 A1 * | 8/2003 | DeBerry et al. | 166/368 |

FOREIGN PATENT DOCUMENTS

GB    2340572 A    2/2000

* cited by examiner

Primary Examiner—David Bagnell
Assistant Examiner—Shane Bomar
(74) Attorney, Agent, or Firm—Bracewell & Giuliani LLP (57) ABSTRACT

A subsea wellhead assembly has a tree that connects internally to the bore of wellhead housing. The tree has a lower end that has a lock member that is moved radially outward into engagement with a profile in the bore of the wellhead housing. The tree is a monobore, having a production passage but no tubing annulus passage extending through it. The tubing hanger has a tubing annulus passage and a production passage. A valve is mounted in the tubing hanger for controlling flow through the tubing annulus passage.

17 Claims, 12 Drawing Sheets

INTERNAL CONNECTION OF TREE TO WELLHEAD HOUSING

This application claims priority from the provisional application Ser. No. 60/332,116, filed Nov. 21, 2001 and to provisional application Ser. No. 60/425,377, filed Nov. 12, 2002, entitled Drilling and Producing Deep Water Subsea Wells.

FIELD OF THE INVENTION

This invention relates in general to subsea wellhead systems and in particular to a production tree with an internal connector for connecting to a wellhead housing.

BACKGROUND OF THE INVENTION

A typical subsea wellhead assembly has a high pressure wellhead housing supported in a lower pressure wellhead housing and secured to casing that extends into the well. One or more casing hangers land in the wellhead housing, the casing hanger being located at the upper end of a string of casing that extends into the well to a deeper depth. A string of tubing extends through the casing for production fluids. A Christmas or production tree mounts to the upper end of the wellhead housing for controlling the well fluid. The production tree is typically a large, heavy assembly, having a number of valves and controls mounted thereon.

One type of tree, sometimes called "conventional", has two bores through it, one of which is the production bore and the other is the tubing annulus access bore. In this type of wellhead assembly, the tubing hanger lands in the wellhead housing. The tubing hanger has two passages through it, one being the production passage and the other being an annulus passage that communicates with the tubing annulus surrounding the tubing. Access to the tubing annulus is necessary to circulate fluids down the production tubing and up through the tubing annulus, or vice versa, to either kill the well or circulate out heavy fluid during completion. After the tubing hanger is installed and before the drilling riser is removed for installation of the tree, plugs are temporarily placed in the passages of the tubing hanger. The tree has isolation tubes that stab into engagement with the passages in the tubing hanger when the tree lands on the wellhead housing. This type of tree is normally run on a completion riser that has two strings of conduit. In a dual string completion riser, one string extends from the production passage of the tree to the surface vessel, while the other extends from the tubing annulus passage in the tree to the surface vessel. It is time consuming, however to assemble and run a dual string completion riser. Also, operators may not have such a completion riser available, requiring one to be provided on a rental basis.

In another type of tree, sometimes called "horizontal" tree, there is only a single bore in the tree, this being the production passage. The tree is landed before the tubing hanger is installed, then the tubing hanger is lowered and landed in the tree. The tubing hanger is lowered through the riser, which is typically a drilling riser. Access to the tubing annulus is available through choke and kill lines of the drilling riser. The tubing hanger does not have an annulus passage through it, but a bypass extends through the tree to a void space located above the tubing hanger. This void space communicates with the choke and kill lines when the blowout preventer is closed on the tubing hanger running string. In this system, the tree is run on drill pipe, thus prevents the drilling rig derrick of the floating platform from being employed on another well while the tree is being run.

In another and less common type of wellhead system, a concentric tubing hanger lands in the wellhead housing in the same manner as a conventional wellhead assembly. The tubing hanger has a production passage and an annulus passage. However, the production passage is concentric with the axis of the tubing hanger, rather than slightly offset as in conventional tubing hangers. The tree does not have vertical tubing annulus passage through it, thus a completion riser is not required. Consequently the tree may be run on a monobore riser. A tubing annulus valve is located in the tubing hanger since a plug cannot be temporarily installed and retrieved from the tubing annulus passage with this type of tree.

SUMMARY OF THE INVENTION

The subsea wellhead assembly of this invention utilizes an essentially concentric tubing hanger and a lightweight tree, thus does not require running of a dual string completion riser. The tree may be efficiently run on a lift line or cable, although it may also be run on a small diameter, lightweight riser. The tree does not have an external connector that locks the tree to an exterior profile on the wellhead housing. Instead, the tree has a lower portion that extends into the bore of the wellhead housing. A locking element on the lower portion is then moved into engagement with a profile formed in the bore of the tree.

The tree is a monobore, having no annulus passage that extends vertically through it. Rather, annulus access is provided by a passage that leads to an exterior side portion of the tree for connection to an external line. The tubing hanger lands in the wellhead housing in the preferred embodiment. The tubing hanger has a production passage that registers with the production passage of the tree when the tree lands. An isolation tube extends from the tree into the tubing hanger for communicating the production tubing with the production passage in the tree.

The tubing hanger also preferably has an offset tubing annulus passage. The tubing annulus passage communicates the tubing annulus with a void space surrounding the isolation tube above the tubing hanger. A tubing annulus valve is located in the upper end of the tubing annulus passage for selectively blocking communication between the void space and the tubing annulus passage.

DETAILED DESCRIPTION OF THE INVENTION

Overall Structure of Subsea Wellhead Assembly

Figure 1A:
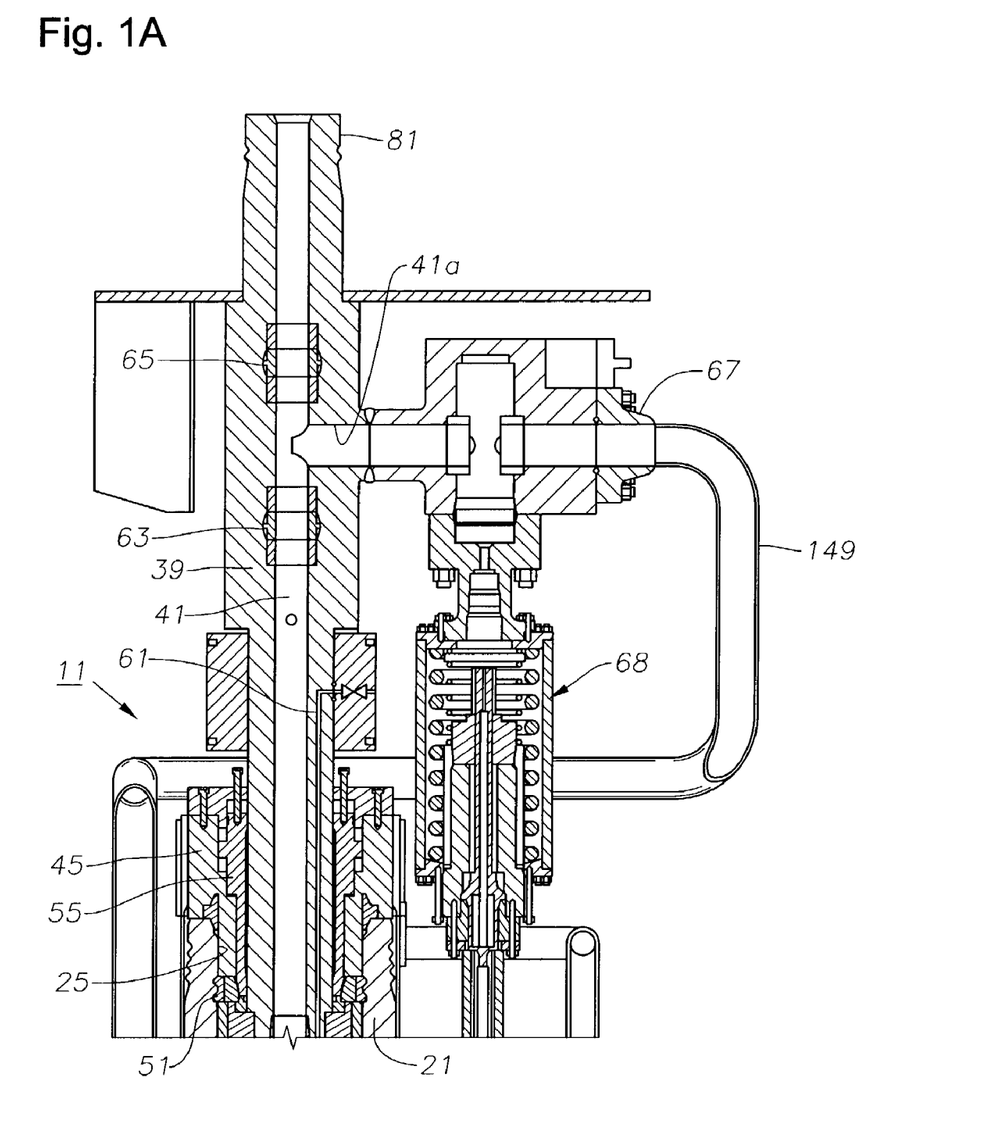
FIGS. 1A and 1B comprise a vertical sectional view of a wellhead assembly constructed in accordance with this invention.
Figure 1B:
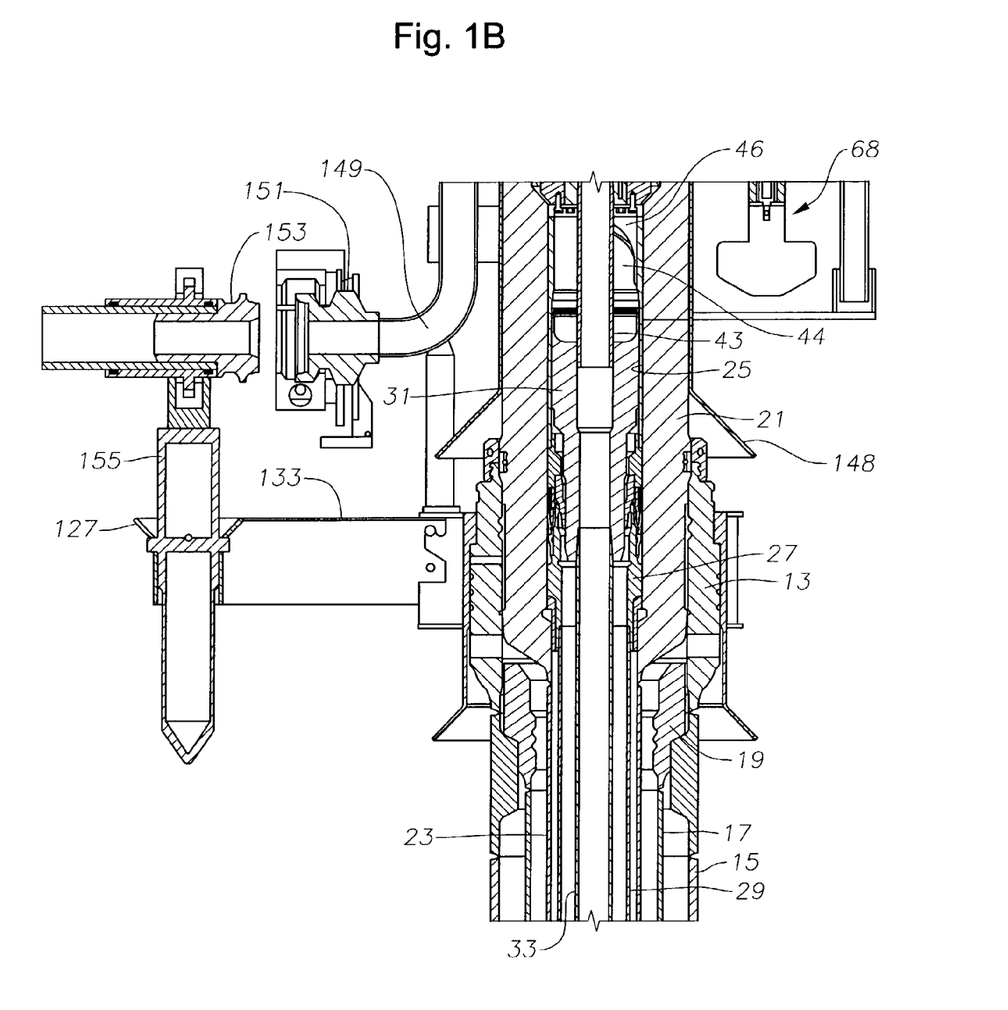

Referring to FIG. 1B, a lower portion of a wellhead assembly 11 includes an outer or low pressure wellhead housing 13 that locates on the sea floor and is secured to a string of large diameter conductor pipe 15 that extends into the well. In this embodiment, a first string of casing 17 is suspended on a lower end of outer wellhead housing 13 by a hanger 19. However, casing 17 and hanger 19 are not always suspended from the outer wellhead housing 13 and can be eliminated in many cases.

An inner or high pressure wellhead housing 21 lands in and is supported within the bore of outer wellhead housing 13. Inner wellhead housing 21 is located at the upper end of a string of casing 23 that extends through casing 17 to a greater depth. Inner wellhead housing 21 has a bore 25 with at least one casing hanger 27 located therein. Casing hanger 27 is sealed within bore 25 and secured to the upper end of a string of casing 29 that extends through casing 23 to a greater depth. Casing hanger 27 has a load shoulder 28 located within its bore or bowl.

Figure 2:
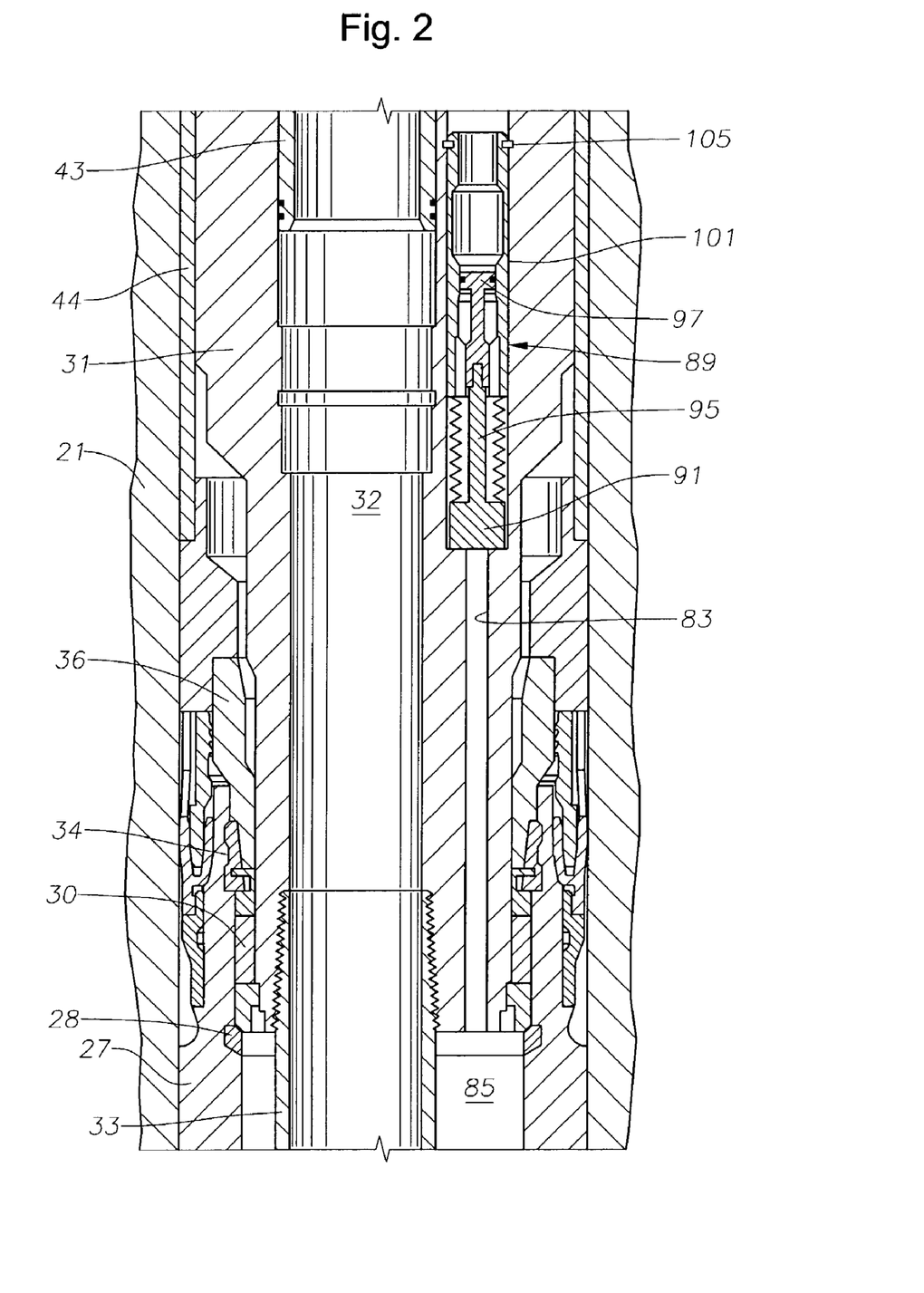
FIG. 2 is an enlarged sectional view of a portion of the wellhead assembly of FIGS. 1A and 1B, the sectional plane being different than in FIGS. 1A and 1B.

In this embodiment, a tubing hanger 31 is landed, locked, and sealed within the bore of casing hanger 27. Referring to FIG. 2, tubing hanger 31 has a lower end that lands on load shoulder 28. A seal 30 seals between the exterior of tubing hanger 31 and the bore of casing hanger 27 above load shoulder 28. A split lock ring 34 moves from a retracted position radially outward to lock tubing hanger 31 to an internal profile in casing hanger 27. A sleeve 36, when moved axially downward, energizes seal 30 as well as pushes lock ring 34 to the locked position. Tubing hanger 31 is secured to the upper end of a string of production tubing 33. Tubing hanger 31 has a production passage 32 that is coaxial with tubing 33.

Figure 3:
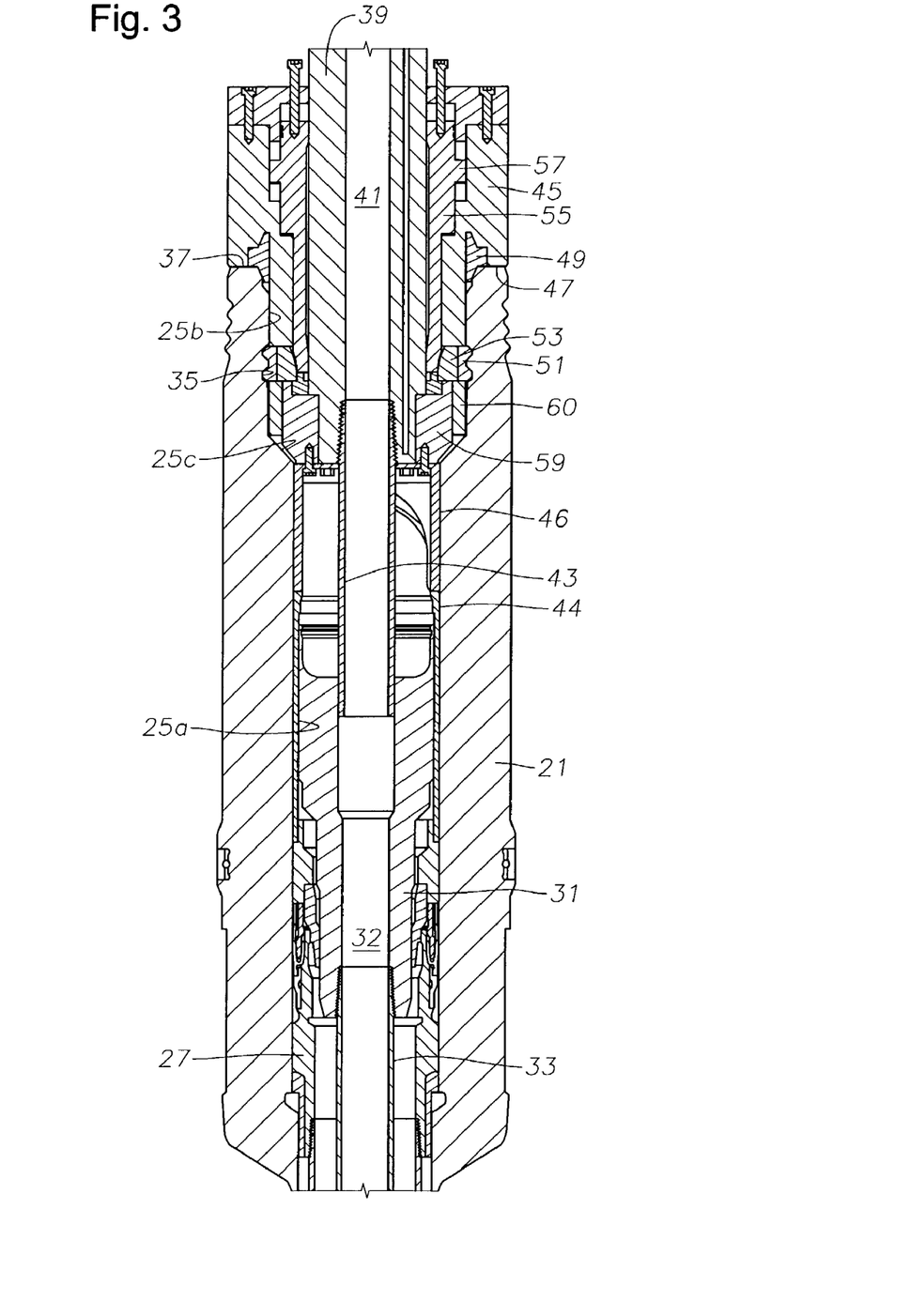
FIG. 3 is an enlarged sectional view of a portion of the wellhead assembly of FIGS. 1A and 1B.

Referring to FIG. 3, inner wellhead housing bore 25 has a lower portion 25a that has a smaller diameter than upper portion 25b. This results in a conical generally upward facing transition portion or shoulder 25c located between portions 25a and 25b. Wellhead housing bore upper portion 25b has a grooved profile 35 formed therein above tubing hanger 31. Profile 35 is located a short distance below rim 37, which is the upper end of inner wellhead housing 21.

As shown in FIG. 1A, a Christmas or production tree 39 has a lower portion that inserts into wellhead housing 21. Production tree 39 has a production passage 41 extending through it that has an outlet port 41a extending laterally outward. Production tree 39 has an isolation tube 43 that depends downward from its lower end and stabs sealingly into production passage 32 of tubing hanger 31. The lower end of production tree 39 extends into bore 25 of inner wellhead housing 21 to bore transition section 25c (FIG. 3).

Referring again to FIG. 3, an orientation sleeve 44 is a part of and extends upward from tubing hanger 31. Orientation sleeve 44 is nonrotatably mounted to the exterior of the body of tubing hanger 31. Orientation sleeve 44 has a helical contour formed on its upper edge. A mating orientation sleeve 46 with a helical contour on its lower edge is secured to the lower end of production tree 39. When tree 39 is lowered into wellhead housing 21, orientation sleeve 46 engages the helical contour of orientation sleeve 44 to rotate production tree 39 and orient it in the desired position relative to tubing hanger 31.

Tree and Wellhead Housing Internal Connector

Referring to FIGS. 1A and 3, tree 39 includes a connector assembly for securing it to wellhead housing 21. The connector assembly includes a connector body 45 that has a downward facing shoulder 47 that lands on rim 37. Connector body 45 is rigidly attached to tree 39. A seal 49 seals between rim 37 and shoulder 47. Connector body 45 also extends downward into wellhead housing 21. A locking element 51 is located at the lower end of connector body 45 for engaging profile 35. Locking element 51 could be of a variety of types. In this embodiment, locking element 51 comprises an outer split ring that has a mating profile to groove 35. A plurality of dogs 53 located on the inner diameter of locking element 51 push locking element 51 radially outward when moved by a cam sleeve 55. Cam sleeve 55 moves axially and is hydraulically driven by hydraulic fluid supplied to a piston 57.

The connector assembly has an extended or retainer portion 59 that extends downward from connector body 45 in this embodiment. Extended portion 59 is located above and secured to orientation sleeve 46. A collar 60 is threaded to the outer diameter of extended portion 59 for retaining locking element 51 and dogs 53 with connector body 45. Alternately dogs 53 could be used to engage profile 35 and locking element 51 omitted. In that case, windows could be provided for the dogs in connector body 45, and extended portion 59 and collar 60 would be integrally formed with connector body 45.

Referring to FIG. 1A, a control fluid passage 61 extends through tree 39 to an exterior side portion for supplying control fluid. Although not shown, there are a number of these passages, and they lead to connector tubes on the lower end of tree 39. The connector tubes stab into mating passages on the upper end of tubing hanger 31. These passages lead to hydraulic control lines that are not shown but extend below tubing hanger 31 on the outside of production tubing 33. These control lines lead to downhole equipment in the string of tubing 33, such as a downhole safety valve and downhole pressure and temperature monitoring devices.

At least one valve is mounted to production tree 39 for controlling fluid flow. In the preferred embodiment, the valves includes a master valve 63 and a swab valve 65 located in production passage 41. A safety shutoff valve 67 is mounted to port 41a. The hydraulic actuator 68 for safety shutoff valve 67 is shown. Valves 63 and 65 may be either hydraulically actuated or mechanically actuated (typically by ROV).

Referring again to FIG. 1A, tree 39 has a mandrel 81 on its upper end that protrudes upward. Mandrel 81 is typically sized for receiving a connector for connection to a small diameter, lightweight riser, such as for certain workover purposes. Mandrel 81 also enables other methods of intervention.

Tubing Annulus Access

Figure 4:
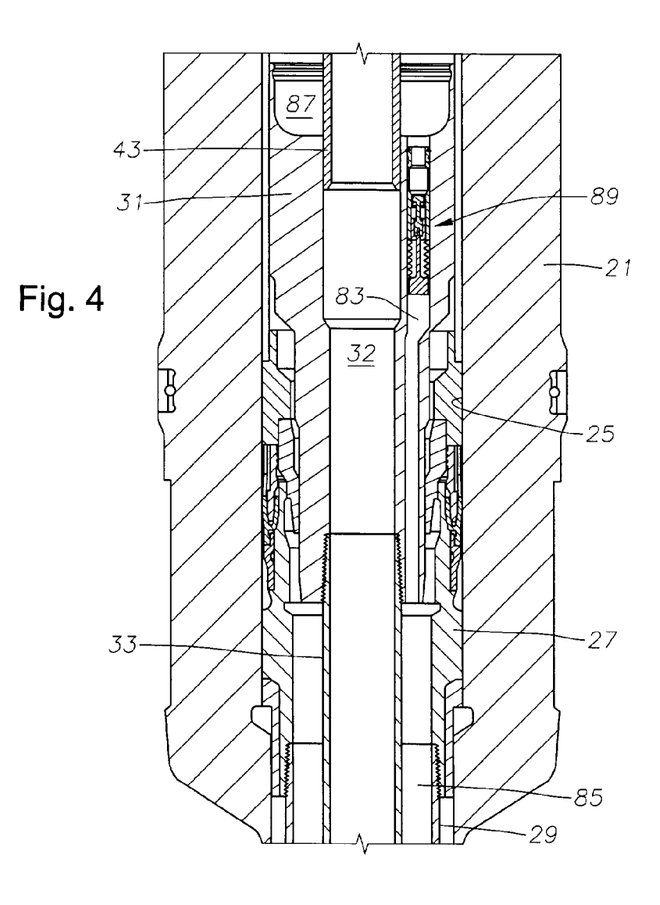
FIG. 4 is an another sectional view of a portion of the wellhead assembly of FIGS. 1A and 1B, but shown in same sectional plane as in FIG. 2 to illustrate a tubing annulus valve in a closed position.

FIG. 4 illustrates a tubing annulus passage 83, which is not shown in FIG. 1B or 3 because tubing annulus passage 83 is located in a different vertical sectional plane than that shown in FIGS. 1B and 3. Tubing annulus passage 83 extends vertically through tubing hanger 31 from an upper end portion to a lower end, where it communicates with a tubing annulus 85 surrounding tubing 33. The upper and lower ends of tubing annulus passage 83 may be slightly radially offset from each other, as shown in FIG. 4. An annular void space 87 surrounds isolation tube 43 between the upper end of tubing hanger 31 and the lower end of tree 39.

Figure 5:
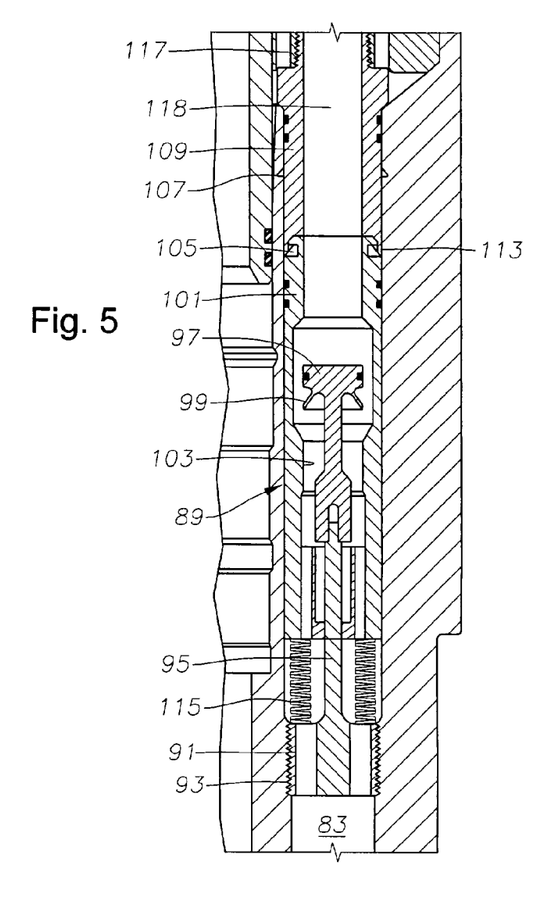
FIG. 5 is an enlarged sectional view of the tubing annulus valve of FIG. 4, shown in an open position and engaged by an engaging member of the production tree.

A tubing annulus valve 89 is mounted in tubing annulus passage 83 to block tubing annulus passage 83 from flow in either direction when closed. Referring to FIG. 5, tubing annulus valve 89 has a stem base 91 that is secured by threads 93 to tubing annulus passage 83. A stem 95 extends upward from stem base 91 along the axis of tubing annulus passage 83. An enlarged valve head 97 forms the upper end of stem 95. Valve head 97 has a secondary resilient seal as well as a primary lip seal 99 that is made of metal in this embodiment.

A shuttle sleeve 101 is reciprocally carried in tubing annulus passage 83. While in the upper closed position shown in FIGS. 4 and 6, the upper end of sleeve 101 is a short distance below an upper end portion of tubing hanger 31. While in the lower open position, shown in FIGS. 5 and 7, sleeve 101 is in a lower position relative to valve head 97. Sleeve 101 has a reduced diameter port or seat 103 formed in its interior. Seat 103 is sealingly engaged by lip seal 99 as well as the resilient seal of valve head 97 while sleeve 101 is in the lower position.

An outward biased split ring 105 is mounted to the outer diameter of sleeve 101 near its upper end. Split ring 105 has a downward tapered upper surface and a lower surface that is located in a plane perpendicular to the axis of tubing annulus passage 83. A mating groove 107 is engaged by split ring 105 while sleeve 101 is in the upper, closed position. Split ring 105 snaps into groove 107, operating as a detent or retainer to prevent downward movement of sleeve 101.

Figure 6:
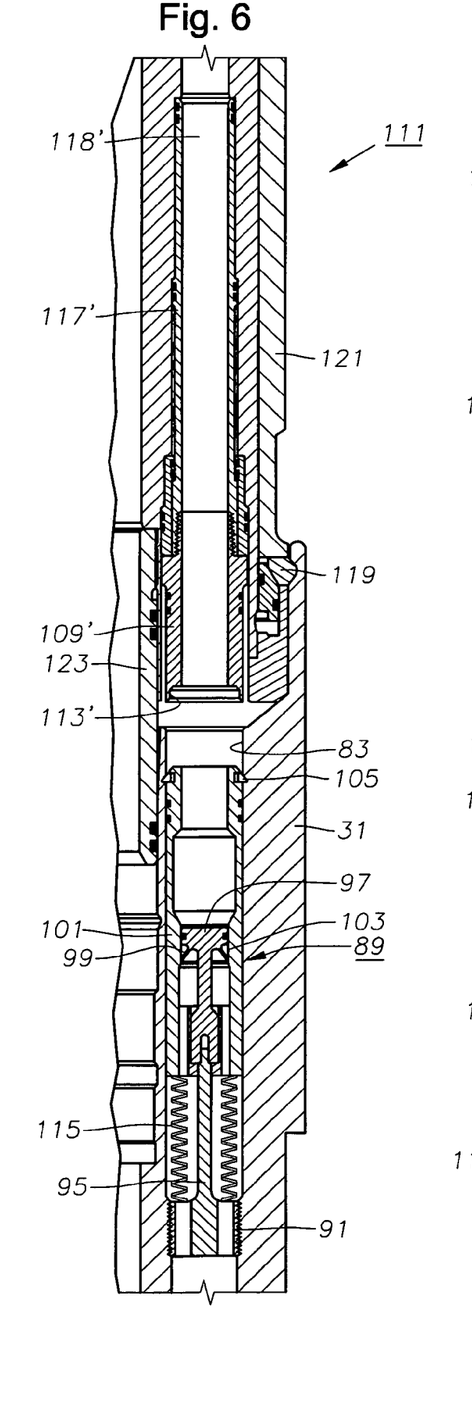
FIG. 6 is an enlarged sectional view of the tubing annulus valve of FIG. 4, shown in a closed position while a tubing hanger running tool is connected to the tubing hanger.
Figure 7:
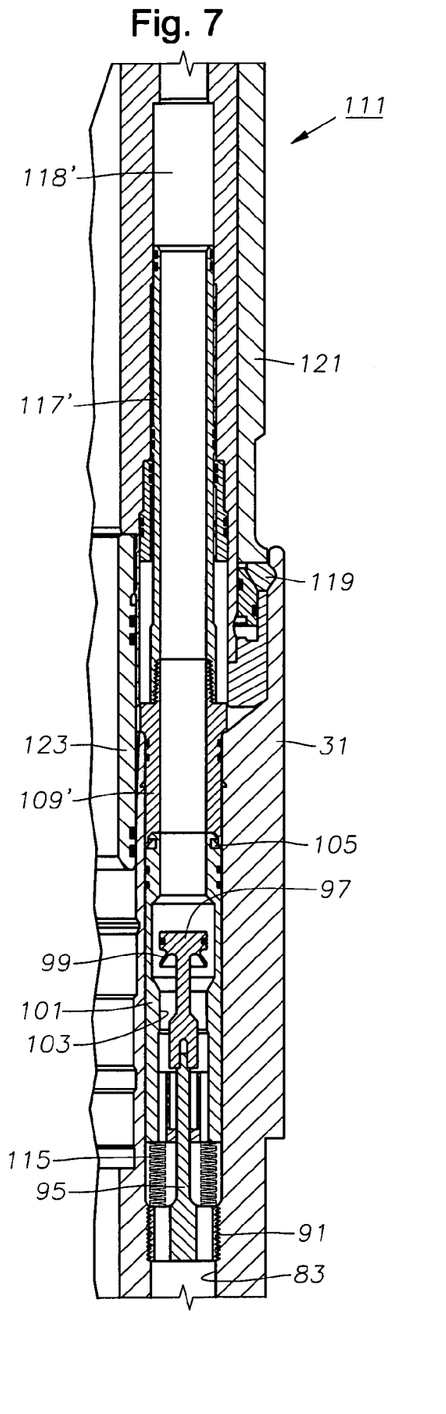
FIG. 7 is a sectional view of the tubing annulus valve as shown in FIG. 6, but shown in an open position.

FIG. 5 shows an engaging tool or member 109 extending into the upper end of tubing annulus passage 83 into engagement with the upper end of sleeve 101. Engaging member 109 is a downward extending component of tree 39 (FIG. 1A) and is used for moving sleeve 101 from the upper to the lower position. A second identical engaging member 109', shown in FIGS. 6 and 7, is mounted to a running tool 111 used to run tubing hanger 31. Engaging member 109 has a lip 113 on its lower end that mates with the upward facing taper on split ring 105. Lip 113 slides over and causes split ring 105 to contract, enabling engaging member 109 to push sleeve 101 downward to the open position. A spring 115, which may be a plurality of Belleville washers, is located between stem base 91 and the lower end of sleeve 101. Spring 115 urges sleeve 101 to the upper closed position. Any pressure in passage 83 would assist spring 115 in moving sleeve 101 to the closed position.

Engaging member 109 is secured to the lower end of an actuator 117, which is mounted in tree 39. Actuator 117 is a hollow, tubular member with open ends reciprocally carried in a tubing annulus passage 118 in tree 39 (FIG. 3). Actuator 117 has a piston portion on its exterior side wall that is selectively supplied with hydraulic fluid for moving actuator 117 between upper and lower positions. Tubing annulus passage 118 extends through tree 39 to an exterior side portion of tree 39 for connection to a tubing annulus line that leads typically to a subsea manifold or an umbilical that serves the tree. Tubing annulus passage in tree 118 does not extend axially to the upper end of tree 39.

When actuator 117 is moved to the lower position, engaging member 109 engages and pushes sleeve 101 from the closed position to the open position. FIGS. 6 and 7 show a similar actuator 117' that forms a part of running tool 111 and works in the same manner as actuator 117. Like actuator 117, actuator 117' has a piston portion that is carried in a hydraulic fluid chamber for causing the upward and downward movement in response to hydraulic pressure. Passage 118' leads to an exterior upper portion of running tool 111 for delivering and receiving tubing annulus fluid.

Running tool 111 has conventional features for running tubing hanger 31, including setting a seal between tubing hanger 31 and bore 25 of wellhead housing 21 (FIG. 4). Running tool 111 has a lock member 119 that is radially and outwardly expansible into a mating groove formed in an interior upward extending sleeve portion of tubing hanger 31. Lock member 119 secures running tool 111 to tubing hanger 31 while tubing 33 is being lowered into the well. Lock member 119 is energized and released by a lock member actuator 121, which is also hydraulically driven. Running tool 111 has a sleeve 123 that slides sealingly into the bore 32 of tubing hanger 31. Sleeve 123 isolates the upper end of tubing annulus passage 83 from production passage 32 (FIG. 4) in tubing hanger 31.

Orientation

Figure 8:
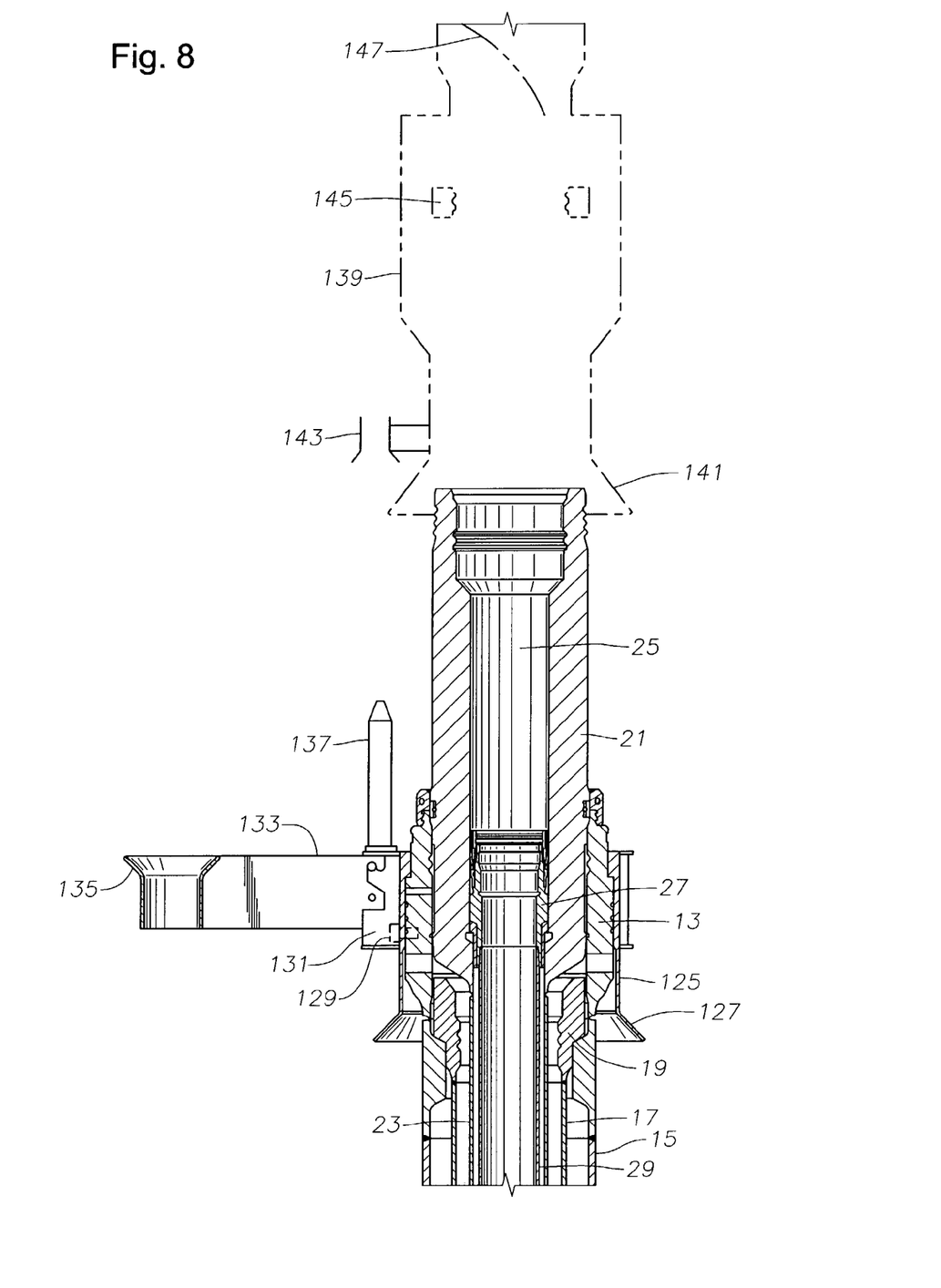
FIG. 8 is a sectional view of the wellhead housings of the wellhead assembly of FIGS. 1A and 1B after running casing and in the process of receiving a BOP adapter.
Figure 9:
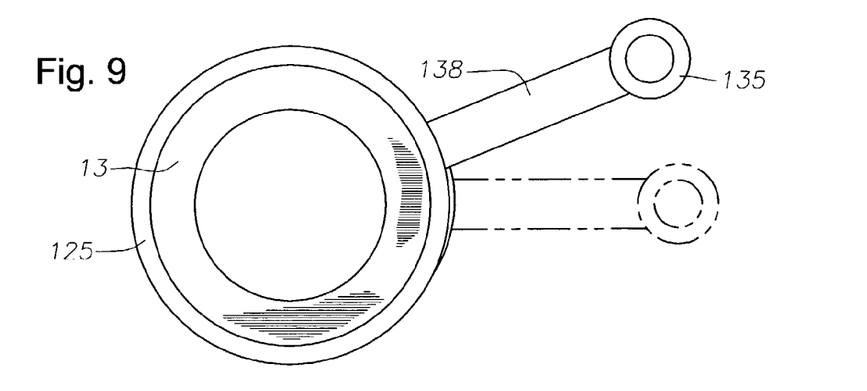
FIG. 9 is a schematic horizontal sectional view of the wellhead housings of FIG. 8, the dotted lines showing a flowline connector arm being rotated.

Referring to FIG. 8, a ring 125 is mounted to the exterior of outer wellhead housing 13, also referred to as a conductor housing. Ring 125 has a depending funnel 127 and is selectively rotatable on outer wellhead housing 13 for orienting tubing hanger 31 and tree 39 (FIG. 3) in a desired position relative to other subsea wells and equipment. A lock pin or screw 129 will selectively lock ring 125 in the desired position. An arm bracket 131 is mounted to ring 125 for rotation therewith. Arm bracket 131 cantilever supports a horizontally extending arm 133. Arm 133 has an upward facing socket on its outer end 131. Also, a guide pin 137 protrudes upward from arm 133.

Ring 125 is normally installed on outer wellhead housing 13 at the surface before outer wellhead housing 13 is lowered into the sea. Arm 133 will be attached to arm bracket 131 below the rig floor but at the surface. After outer wellhead housing 13 is installed at the sea floor, if necessary, an ROV may be employed later in the subsea construction phase to rotate ring 125 to a different orientation.

A BOP (blowout preventer) adapter 139 is being shown lowered over inner or high pressure housing 21. BOP adapter 139 is used to orient tubing hanger 31 (FIG. 3) relative to arm 133. BOP adapter 139 is preferably lowered on a lift line after the well has been drilled and casing hanger 27 installed. The drilling riser, along with the BOP, will have been removed from the upper end of inner wellhead housing 21 prior to lowering BOP adapter 139 in place. BOP adapter 139 has a guide socket 143 that is mounted to its exterior at a point for aligning with pin 137. A funnel 141 on the lower end of BOP adapter 139 assists in lowering BOP adapter 139 over inner wellhead housing 21. Socket 143 will orient BOP adapter 139 to a position depending upon the orientation of arm 133 and pin 137. An ROV (not shown) will be used to assist guide socket 143 in aligning with guide pin 137.

BOP adapter 139 has a plurality of dogs 145 that are hydraulically energized to engage an external profile on inner wellhead housing 21. BOP adapter 139 also has seals (not shown) that seal its bore to bore 25 of wellhead housing 21. A helical orienting slot 147 is located within the bore of BOP adapter 139. Slot 147 is positioned to be engaged by a mating pin or lug on running tool 111 (FIG. 6) for tubing hanger 31. This engagement causes running tool 111 to orient tubing hanger 31 in a desired orientation relative to the orientation of arm 133.

Figure 10:
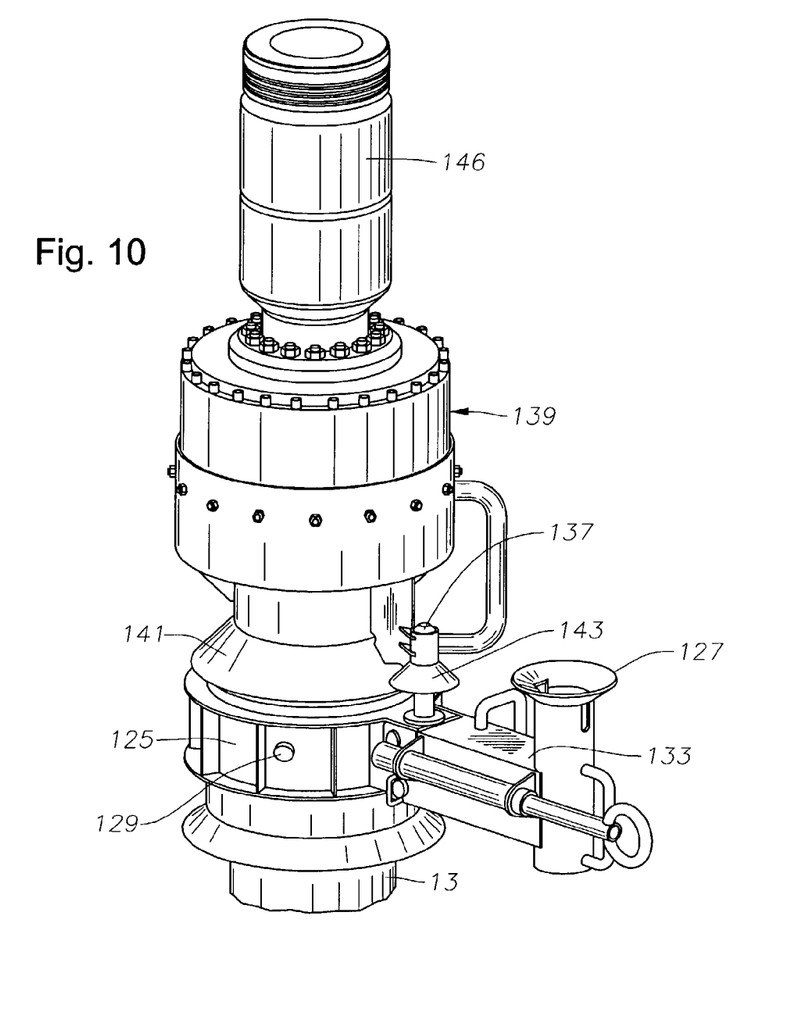
FIG. 10 is a perspective view of the wellhead assembly of FIGS. 1A and 1B, after the BOP adapter of FIG. 8 has landed.

FIG. 10 is a perspective view showing BOP adapter 139 in position on inner wellhead housing 21, which is not shown in FIG. 10 because it is located within the bore of BOP adapter 139. BOP adapter 139 has an upper end with a mandrel 146. The drilling riser and BOP will connect to the external profile on mandrel 146 after BOP adapter 139 has been connected to inner wellhead housing 21.

Once BOP adapter 139 has oriented tubing hanger 31 (FIG. 1B), the well will typically be perforated and tested. Tubing hanger 31 must be oriented relative to the arm 133 because orientation sleeve 44 (FIG. 3) of tubing hanger 31 provides orientation to tree 39, as shown in FIGS. 1A and 1B. Tree 39 has a tree funnel 148 that slides over inner wellhead housing 21 as it is landing.

The safety shutoff valve 67 of tree 39 is connected to a flow line loop 149 that leads around tree 39 to a flow line connector 151 on the opposite side as shown in FIG. 1B. Flow line connector 151 will connect to a flow line 153 that typically leads to a manifold or subsea processing equipment. In this embodiment, flow line 153 is mounted to a vertical guide pin or mandrel 155 that stabs into guide funnel 135 to orient to tree 39. Other types of connections to flow line connector 151 could also be employed. Consequently, tree is oriented so that its flowline connector 151 will register with flowline 153.

Plug Retrieval and Installation

Figure 11:
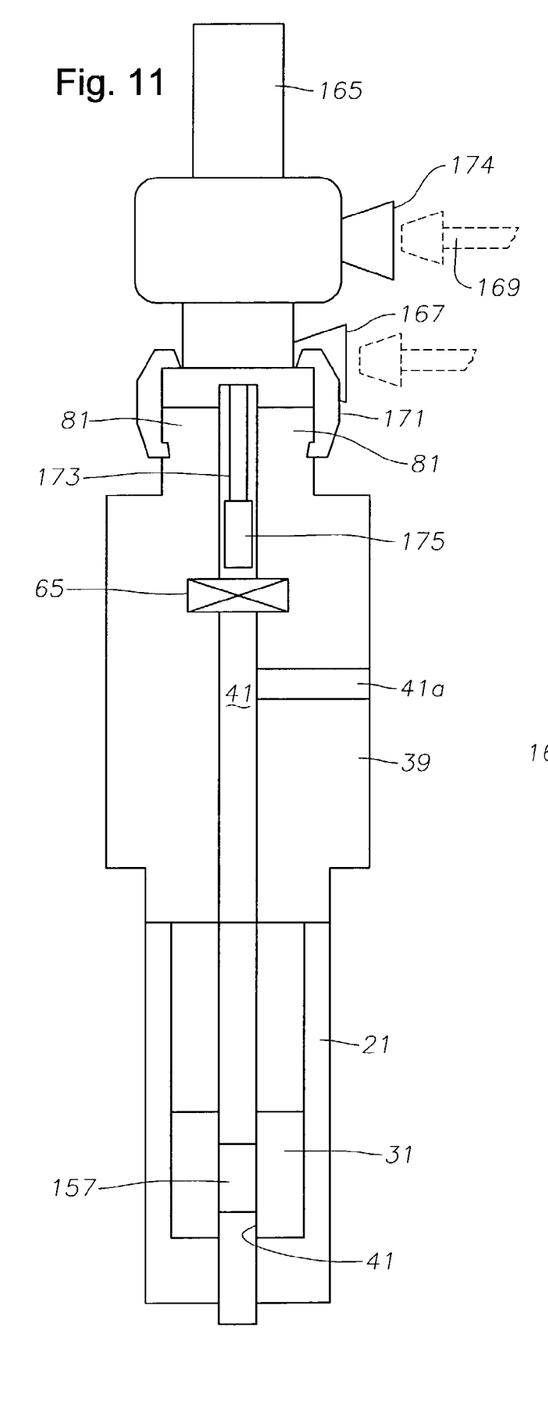
FIG. 11 is a schematic vertical sectional view of the wellhead assembly of FIGS. 1A and 1B, showing an ROV deployed plug tool mounted on the tree.

After tree 39 is installed, a plug 159 (FIG. 12) must be removed from a plug profile 157 located within tubing hanger 31, as shown in FIG. 11. Plug 159 maintains pressure that is within tubing 33 after BOP adapter 139 (FIG. 10) is removed and prior to installing tree 39 (FIG. 1A). Plug 159 is conventional and has one or more seals 161 that seal within production passage 41 of tubing hanger 31. Plug 159 has a plurality of locking elements 163 that will move radially outward between a retracted and an extended position. Locking elements 163 engage a mating groove in profile 157.

Preferably, rather than utilizing wireline inside a workover riser, as is typical, an ROV deployed plug tool 165 is utilized. Plug tool 165 does not have a riser extending to the surface, rather it is lowered on a lift line. Plug tool 165 has a hydraulic or mechanical stab 167 for engagement by ROV 169. Plug tool 165 lands on top of tree mandrel 81. A seal retained in plug tool 165 engages a pocket in mandrel 81 of tree 39. When supplied with hydraulic pressure or mechanical movement from ROV 169, a connector 171 will engage mandrel 81 of tree 39. Similarly, connector 171 can be retracted by hydraulic pressure or mechanical movement supplied from ROV 169.

Figure 12:
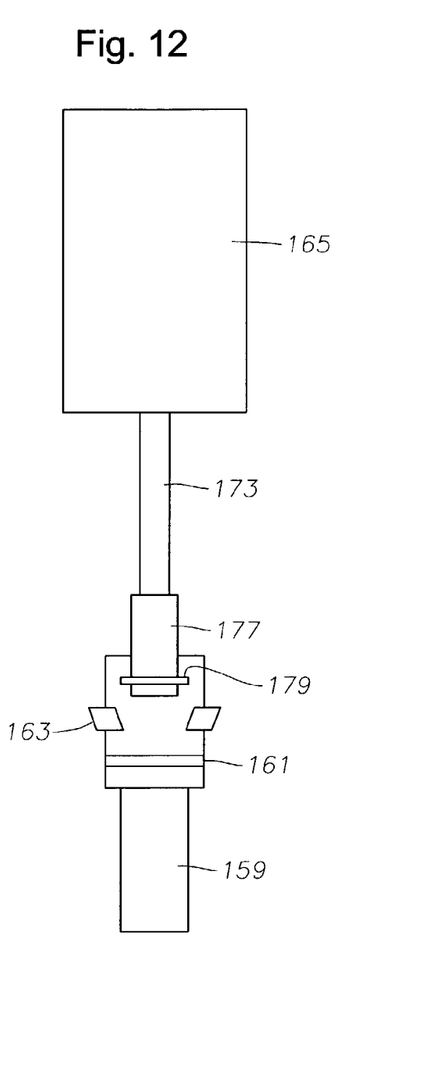
FIG. 12 is a schematic side view of the plug tool of FIG. 11, with a plug setting attachment.

Plug tool 165 has an axially movable stem 173 that is operated by hydraulic pressure supplied to a hydraulic stab 174. A retrieving tool 175 is located on the lower end of stem 173 for retrieving plug 159. Similarly, a setting tool 177 may be attached to stem 173 for setting plug 159 in the event of a workover that requires removal of tree 39. Setting tool 177 may be of a variety of types and for illustration of the principle, is shown connected by shear pin 179 to plug 159. Once locking elements 163 have engaged profile 157, an upward pull on stem 173 causes shear pin 179 to shear, leaving plug 159 in place.

Figure 13:
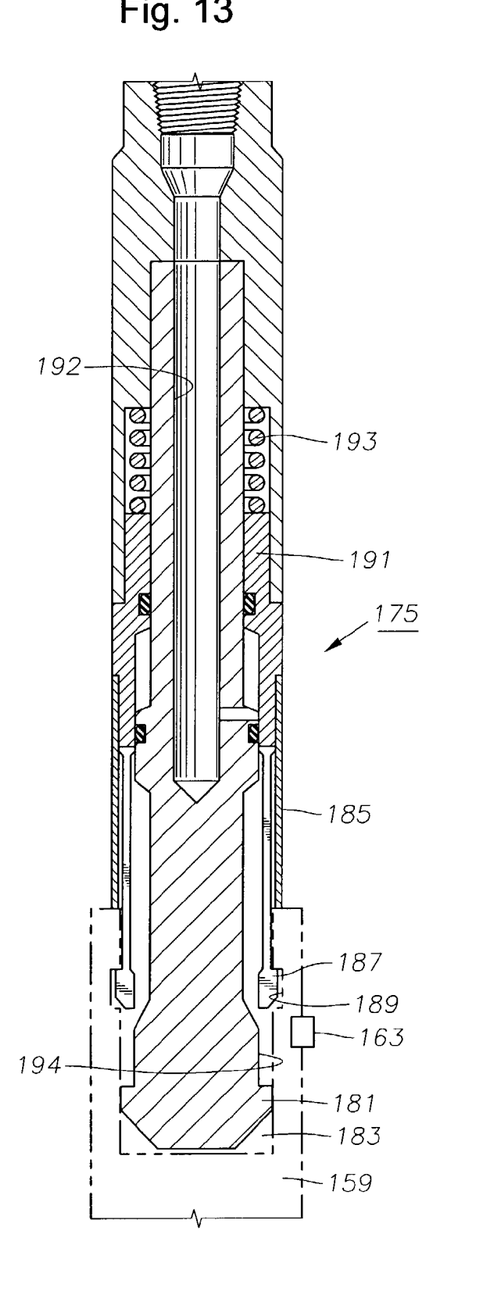
FIG. 13 is a schematic sectional view of a plug retrieving attachment for the plug tool of FIG. 11, shown in a disengaged position with a plug, illustrated by the dotted lines.
Figure 14:
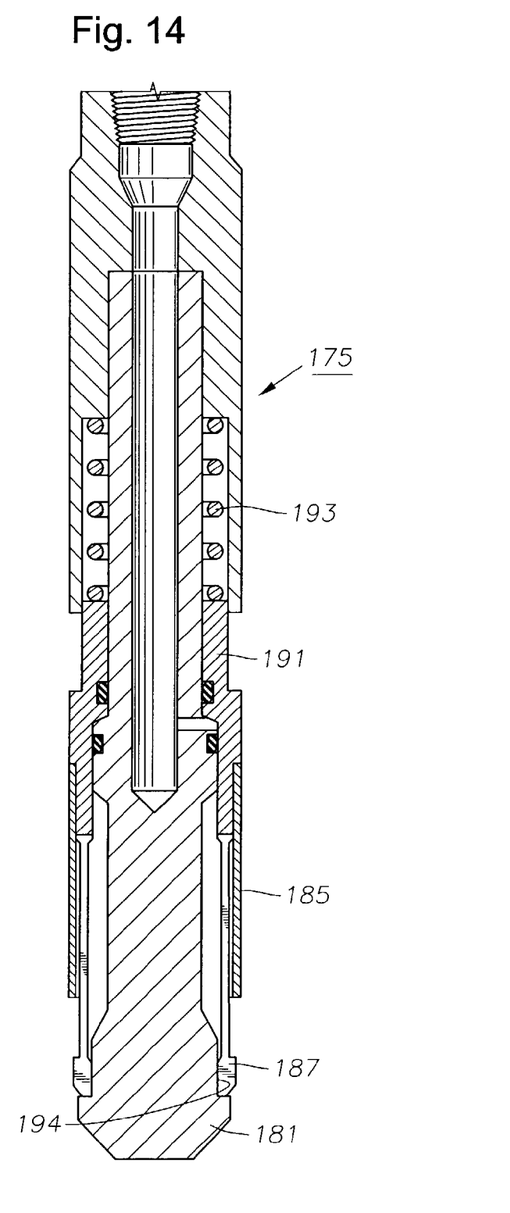
FIG. 14 is a more detailed sectional view of the plug retrieving attachment of FIG. 13, shown in an engaged position.

Retrieving tool 175, shown in FIGS. 13 and 14, may also be of a variety of conventional types. In this embodiment, retrieving tool 175 has a body 181 that inserts partially into a receptacle 183 in plug 159. A locator sleeve 185 on the exterior of body 181 will land on the rim of receptacle 183. A collet 187 is located within locator sleeve 185 and protrudes below a selected distance. When locator sleeve 185 has landed on the rim of plug 159, collet 187 will be aligned with a groove 189 within the plug 159.

Collet 187 and sleeve 185 are joined to a piston 191. Piston 191 is supplied with hydraulic fluid from ROV 169 (FIG. 10) via one of the stabs 174. A spring 193 is compressed while retrieving tool 175 is in the released position, shown in FIG. 13. Spring 193 urges piston 191 to a lower position. When hydraulic pressure is relieved at passage 192, spring 193 will cause body 181 to move upward to the position shown in FIG. 14. In this position, a wall portion 194 of body 181 will locate directly radially inward of collet 187, preventing collet 187 from disengaging from profile 189. Once retrieving tool 175 is attached to plug 159, ROV 169 will actuate one of the hydraulic stabs or mechanical interfaces 174 to cause stem 173 (FIG. 11) to move upward. Collet 187 causes dogs 163 to be radially retractable during this upward movement as plug 159 is disengaged. Once plug 159 is above tree valve 65, tree valve 65 may be closed, enabling the entire assembly of plug tool 165 to be retrieved to the surface with a lift line.

Field Development

Figure 15:
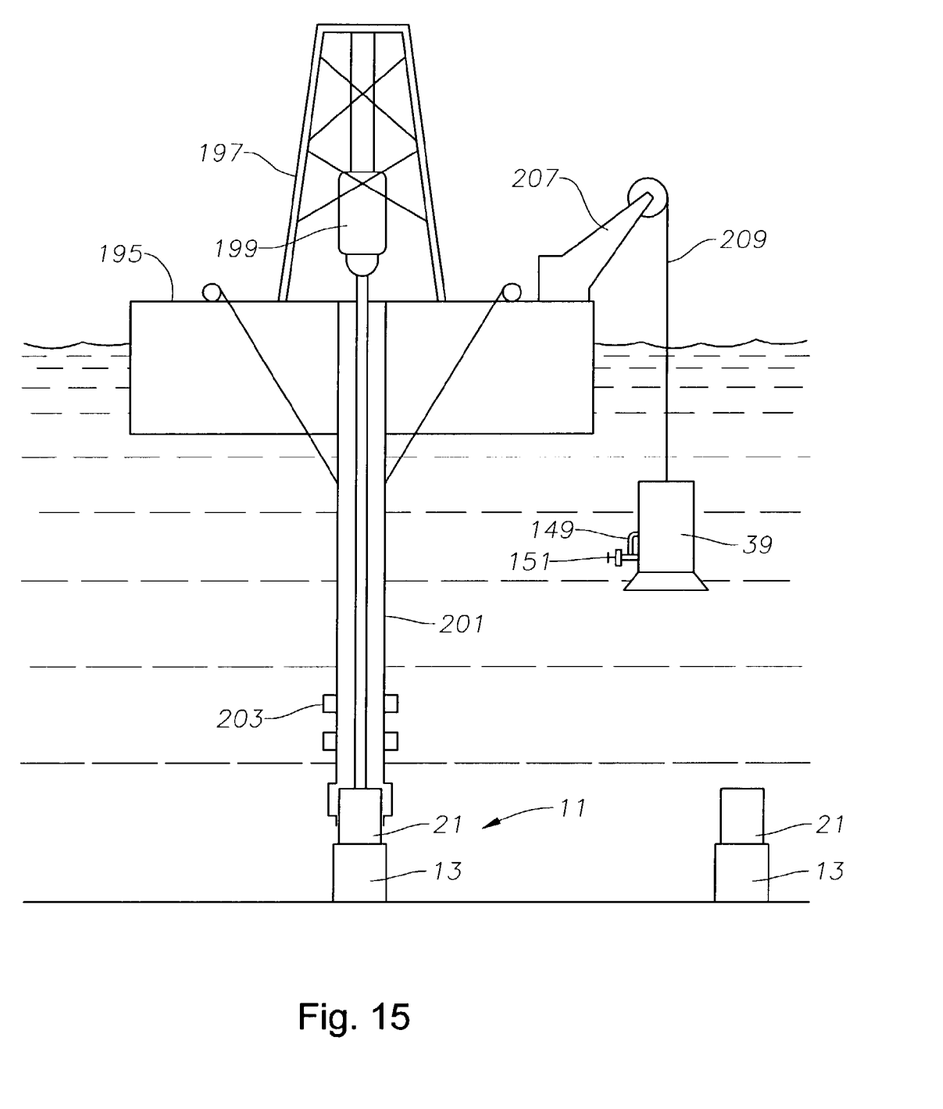
FIG. 15 is a schematic view of a drilling platform in engagement with one subsea wellhead assembly, while a lift line on the platform is in engagement with another subsea wellhead assembly.

FIG. 15 schematically illustrates a preferred method for developing a field having a plurality of closely spaced wellhead assemblies 11. This method is particularly useful in water that is sufficiently deep such that a floating platform 195 must be utilized. Platform 195 will be maintained in position over the wells by various conventional means, such as thrusters or moorings. Platform 195 has a derrick 197 with a drawworks 199 for drilling and performing certain operations on the wells. Platform 195 also has a drilling riser 201 that is employed for drilling and casing the wells. Drilling riser 201 is shown connected to high pressure housing 21 of one wellhead assembly 11. Drilling riser 201 has a blowout preventer 203 within it. In the particular operation shown, a string of drill pipe 205 is shown extending through riser 201 into the well.

Platform 195 also preferably has a crane or lift line winch 207 for deploying a lift line 209. Lift line 207 is located near one side of platform 195 while derrick 197 is normally located in the center. Optionally, lift line winch 207 could be located on another vessel that typically would not have a derrick 197. In FIG. 14, a tree 39 is shown being lowered on lift line 209.

Drilling and Completion Operation

In operation, referring to FIG. 8, outer housing 13 along with ring 125 and arm 133 are lowered into the sea. Outer housing 13 is located at the upper end of conductor 15, which is jetted into the earth to form the first portion of the well. As conductor 15 nears the seabed, the entire assembly and arm 133 will be set in the desired position. This position will be selected based on which way the field is to be developed in regard to other wells, manifolds, subsea processing equipment and the like. Once conductor 15 has been jetted into place and later in the subsea construction program, the operator may release lock pins 129 and rotate ring 125 to position arm 133 in a different orientation. This subsequent repositioning of arm 133 is performed as necessary or as field development needs change to optimize connection points for the well flowline jumpers.

The operator then drills the well to a deeper depth and installs casing 117, if such casing is being utilized. Casing 117 will be cemented in the well. The operator then drills to a deeper depth and lowers casing 23 into the well. Casing 23 and high pressure wellhead housing 21 are run on drill pipe and cemented in place. No orientation is needed for inner wellhead housing 21. The operator may then perform the same steps for two or more adjacent wells by repositioning the drilling platform 195 (FIG. 15).

The operator connects riser 201 (FIG. 15) to inner wellhead housing 21 and drills through riser 201 to the total depth. The operator then installs casing 29, which is supported by casing hanger 27. In some cases, an additional string of casing would be installed with the well being drilled to an even greater depth.

The operator is then in position to install tubing hanger 31 (FIG. 1B). First, the operator disconnects drilling riser 201 (FIG. 15) and BOP 203 and suspends it off to one side of wellhead assembly 11. The operator lowers BOP adapter 139 on lift line 209 over inner wellhead housing 21, as illustrated in FIG. 8. With the aid of an ROV, socket 143 is positioned to align with pin 137. BOP adapter 139 is locked and sealed to inner wellhead housing 21. BOP adapter 139 may have been previously installed on an adjacent well left temporarily abandoned.

The operator then attaches drilling riser 201, including BOP 203, (FIG. 15) to mandrel 146 (FIG. 10) of BOP adapter 139. The operator lowers tubing 33 and tubing hanger 31 through drilling riser 201 on running tool 111 (FIG. 6), which is attached to a tubing hanger running string, which is a small diameter riser. Once running tool 111 is connected to tubing hanger 31, actuator 117' is preferably stroked to move engaging member 109' downward, thereby causing shuttle sleeve 101 to move downward. This opens tubing annulus passage 83 for upward and downward flow. Running tool 111 has a retractable pin (not shown) that engages BOP adapter guide slot 147 (FIG. 8), causing it to rotate tubing hanger 31 to the desired position as it lands within casing hanger 27.

After tubing hanger 31 has been set, the operator may test the annulus valve 89 by stroking actuator 117' upward, disengaging engaging member 109 from sleeve 101 as shown in FIG. 6. Spring 115 pushes sleeve 101 to the upper closed position. In this position, valve head seal 99 will be engaging sleeve seat 103, blocking flow in either the upward or downward direction. While in the upper position, detent split ring 105 engages groove 107, preventing any downward movement.

The operator then applies fluid pressure to passage 118' within running tool 111. This may be done by closing the blowout preventer in drilling riser 201 on the small diameter riser above running tool 111. The upper end of passage 118' communicates with an annular space surrounding the small diameter riser below the blowout preventer in drilling riser 201. This annular space is also in communication with one of the choke and kill lines of drilling riser 201. The operator pumps fluid down the choke and kill line, which flows down passage 118' and acts against sleeve 101. Split ring 105 prevents shuttle sleeve 101 from moving downward, allowing the operator to determine whether or not seals 99 on valve head 97 are leaking.

The well may then be perforated and completed in a conventional manner. In one technique, this is done prior to installing tree 39 by lowering a perforating gun (not shown) through the small diameter riser in the drilling riser 201 (FIG. 15) and through tubing 33. The smaller diameter riser may optionally include a subsea test tree that extends through the drilling riser.

If desired, the operator may circulate out heavy fluid contained in the well before perforating. This may be done by opening tubing annulus valve 89 by stroking actuator 117' and engaging member 109' downward. Engaging member 109' releases split ring 105 from groove 107 and pushes sleeve 101 downward to the open position of FIG. 7. A port such as a sliding sleeve (not shown) at the lower end of tubing 33 is conventionally opened and the blowout preventer in drilling riser 201 is closed around the tubing hanger running string. The operator may circulate down the running string and tubing 33, with the flow returning up tubing annulus 85 into drilling riser 201 and up a choke and kill line. Reverse circulation could also be performed.

After perforating and testing, the operator will set plug 159 (FIG. 12) in profile 157 (FIG. 11) in tubing hanger production passage 32. Tubing annulus valve 89 is closed to the position of FIG. 6 by stroking actuator 117' upward, causing spring 115 to move sleeve 101 upward. The operator then retrieves running tool 111 on the running string through the blowout preventer and drilling riser 201. The downhole safety valve (not shown) in tubing 33 is above the perforations and is preferably closed to provide a first pressure barrier; plug 159 in tubing hanger production passage 32 providing a second pressure barrier. Tubing and a packer act as first barrier to formation pressure relative to the tubing annulus, thus tubing annulus 85 normally would have no pressure, and tubing annulus valve 89 provides a temporary barrier in the event the first barrier leaks.

The operator then retrieves running tool 111 (FIG. 6) on the small diameter riser. The operator releases drilling riser 201 and BOP 203 from BOP adapter 139 (FIG. 8) and retrieves BOP adapter 139 on lift line 209 (FIG. 15) or deploys BOP adapter 139 on an adjacent well. The operator may then skid platform 195 sequentially over the other wells for performing the same functions with BOP adapter 139 and drilling riser 201 for a different well. Once tubing 29 has been run and perforated, there is no more need for drilling riser 201 or derrick 197 (FIG. 15). Even though platform 195 may have skidded out of alignment with the particular well, an ROV can guide lift line 209 down to engage and retrieve or move BOP adapter 139.

The operator is now in position for running tree 39 on lift line 209 (FIG. 15). Tree 39 orients to the desired position by the engagement of the orienting members 44 and 46 (FIG. 3). This positions tree connector 151 in alignment with flowline connector 153, if such had already been installed, or at least in alignment with socket 127. Flowline connector 153 could be installed after installation of tree 39, or much earlier, even before the running of high pressure wellhead housing 21. As tree 39 lands in wellhead housing 21, its lower end will move into bore 25 of wellhead housing 21, and isolation tube 43 will stab into production passage 32 of tubing hanger 31. While being lowered, orientation member 44 engages orientation sleeve 46 to properly orient tree 39 relative to tubing hanger 31. Once landed, the operator supplies hydraulic fluid pressure to cam sleeve 55, causing dogs 53 to push locking element 51 (FIG. 2) to the outer engaged position with profile 35. Flowline connector 151 (FIG. 1B) of tree 39 aligns with flowline connector 153, and the tubing annulus passage (not shown) in tree 39 is connected to a manifold or a related facility.

Referring to FIGS. 11–13, in a preferred technique, with lift line 209 (FIG. 15) and the assistance of ROV 169, the operator connects plug tool 165 to tree mandrel 81 and removes plug 159 in tubing hanger 31 with retrieval tool 175. Tree valve 65 is closed once plug 159 is above it. Plug tool 165 may be retrieved and a tree cap installed, typically using ROV 169. Tree 39 should be ready for production.

Referring to FIG. 5, during production, tubing annulus valve 89 may remain closed, but is typically held open for monitoring the pressure in tubing annulus 85. If tubing annulus valve 89 is closed, it can be opened at any time by stroking actuator 117 (FIG. 5) of tree 39 downward. Any pressure within tubing annulus 85 is communicated through tubing annulus passage 118 in tree 39 and to a monitoring and bleedoff facility.

For a workover operation that does not involve pulling tubing 33, a light weight riser with blowout preventer may be secured to tree mandrel 81. An umbilical line would typically connect the tubing annulus passage on tree 39 to the surface vessel. Wireline tools may be lowered through the riser, tree passage 41 and tubing 33. The well may be killed by stroking actuator 117 (FIG. 5) downward to open tubing annulus valve 89. Circulation can be made by pumping down the riser, through tubing 33, and from a lower port in tubing 33 to tubing annulus 85. The fluid returns through tubing annulus passage 83 and passage 118 in tree 39 to the umbilical line.

For workover operations that require pulling tubing 33, tree 39 must be removed from wellhead housing 21. A lightweight riser would not be required if tubing hanger plug 159 (FIG. 12) is reset into profile 157 of tubing hanger 31 with plug tool 165 (FIG. 11). The operator installs plug tool 165 using lift line 209 (FIG. 15) and ROV 169. Plug 159 is typically attached to stem 173 and setting tool 177 by shear pin 179 and lowered into profile 157. Once locking elements 163 latch into profile 157, the operator pulls upward, releasing setting tool 177 from plug 159 by shearing pin 179. The downhole safety valve in tubing 33 typically would be closed during this operation. Tree 39 is retrieved on lift line 209 with the assistance of ROV 169. Then drilling riser 201 (FIG. 15) is lowered into engagement with inner wellhead housing 21. The operator retrieves tubing 33 and performs the workover in a conventional manner.

Alternate Embodiment

Figure 16:
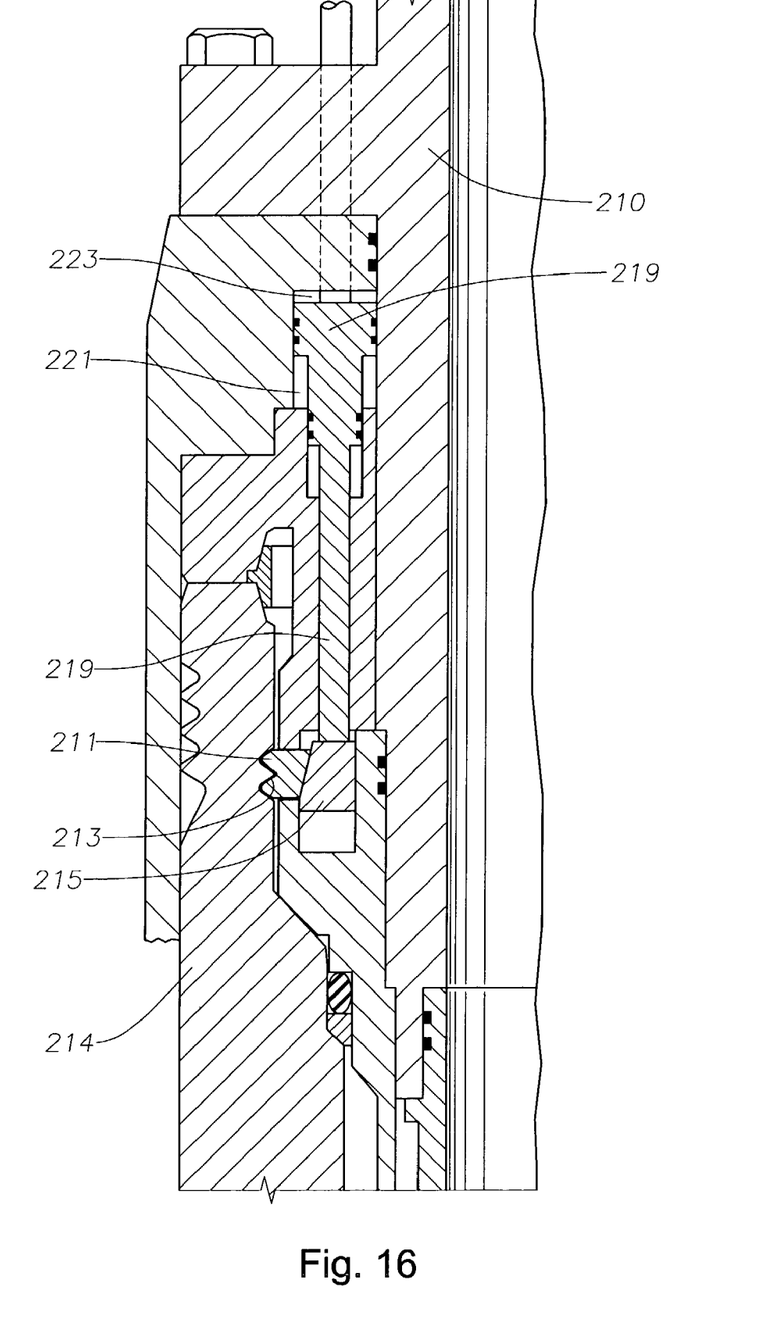
FIG. 16 is a vertical sectional view of an alternate embodiment of the portion of the tree of FIGS. 1A and 1B that connects to the inner wellhead housing.

FIG. 16 shows an alternate embodiment for the internal connector portions of a tree 210. Tree 210 is the same as tree 39, but for its connecting mechanism. Tree 210 has a plurality of dogs 211 that move radially inward and outward between retracted and extended positions. Dogs 211 engage an internal profile 213 located within the bore of wellhead housing 214. A cam 215 when moved axially upward, causes dogs 211 to move radially outward.

Cam 215 is secured to a plurality of rods 217. Rods 217 lead to an annular piston 219. Piston 219 has a lock chamber 22 that causes it to move upward when supplied with hydraulic fluid pressure, moving cam 215 to the upper position. Piston 219 also has an unlocking chamber 223. When supplied with hydraulic fluid pressure, the pressure in unlocking chamber 223 forces piston 219 downward to free dogs 211 to retract. Preferably the taper between cam 215 and dogs 211 is a locking taper so that cam 215 will not move downward if hydraulic pressure fails.

The invention has significant advantages. Connecting the tree to the wellhead housing with an internal connector reduces a significant amount of weight. This allows the tree to be efficiently run on a lift line, which saves time as well as freeing up the derrick for work on another well.

While the invention has been shown in only two of its forms, it should be apparent to those skilled in the art that it is not so limited but is susceptible to various changes without departing from the scope of the invention. The tree could be run on a riser rather than a lift line, in which case the temporary wireline plug in the tubing hanger production passage would be conventionally retrieved on wireline. If run on a riser, perforating could be accomplished after the tree is in place by lowering the perforating gun through the riser and tree.

We claim:

1. A subsea wellhead assembly, comprising:
   an outer wellhead housing adapted to be secured to a string of conductor pipe extending into the well;
   an inner wellhead housing that lands in and extends upward above the outer wellhead housing and is adapted to be secured to a string of casing extending through the conductor pipe into the well, the inner wellhead housing having a bore with an internal grooved profile located therein; and
   a production tree being a separate component from a tubing hanger or a casing hanger, having a lower portion that locates in the bore of the inner wellhead housing and is secured to the profile, the production tree having an upper portion protruding above the inner wellhead housing.

2. The assembly according to claim 1, wherein the inner wellhead housing has a rim on an upper end, and the production tree has a downward facing shoulder that lands on the rim to support the weight of the tree.

3. The assembly according to claim 1, further comprising:
   a radially expansible lock member mounted to an exterior of the lower portion of the tree; and
   a hydraulically driven axially movable cam sleeve mounted to an exterior of the lower portion of the tree in engagement with the lock member, the cam sleeve, when moved axially, causing the lock member to move radially outward into engagement with the profile in the inner wellhead housing.

4. The assembly according to claim 1, further comprising a production flow passage extending through the tree, the production flow passage including a laterally extending port leading through a side wall of the tree for delivering well fluid laterally from the tree.

5. The assembly according to claim 1, further comprising:
   a tubing hanger landed in the inner wellhead housing, the tubing hanger adapted to be connected to a string of tubing extending into the well, the tubing hanger being in communication with a production passage in the tree for flowing production fluid from the well into the production passage.

6. The assembly according to claim 1, further comprising:
   a tubing hanger landed in the inner wellhead housing, the tubing hanger adapted to be connected to a string of tubing extending into the well, the tubing hanger having a production passage in communication with a production passage in the tree for flowing production fluid from the well into the production passage; and a tubing annulus passage in the tubing hanger adapted to be in communication with a tubing annulus surrounding the tubing.

7. A subsea wellhead assembly, comprising:

an outer wellhead housing adapted to be secured to a string of conductor pipe extending into the well;

an inner wellhead housing adapted to be secured to a string of casing extending through the conductor pipe into the well, the inner wellhead housing having a bore with an internal grooved profile located therein, the inner wellhead housing landing in the outer wellhead housing and extending upward above the outer wellhead housing;

a casing hanger landed in the bore of the inner wellhead housing for securing to a string of casing that extends through the first mentioned string of casing;

a tubing hanger landed in the bore of the inner wellhead housing for securing to a string of production tubing that extends through the strings of casing, the tubing hanger being located below the internal profile in the bore of the inner wellhead housing;

a production tree having a downward facing shoulder that lands on an upper end of the inner wellhead housing and a lower portion that extends into the bore of the inner wellhead housing, the production tree having an upper portion protruding above the inner wellhead housing, and the production tree having a production flow passage extending through the tree, the production flow passage including a laterally extending port leading through a side wall of the tree for delivering well fluid laterally from the tree; and a lock member mounted to the lower portion of the tree for engagement with the grooved profile.

8. The wellhead assembly according to claim 7, wherein the production flow passage of the tree is aligned with a production passage in the tubing hanger; and the well assembly further comprises:

an isolation tube extending from the lower end of the tree into sealing engagement with the production passage in the tubing hanger; and at least one production valve mounted to the tree for controlling well fluid flow through the production flow passage of the tree.

9. The wellhead assembly according to claim 7, wherein the lock member comprises a radially expansible element and a hydraulically driven axially movable cam sleeve for expanding the expansible element into engagement with the grooved profile.

10. The wellhead assembly according to claim 7, further comprising:

a tubing annulus passage in the tubing hanger, having a lower end adapted to be in communication with a tubing annulus surrounding the tubing and an upper end on an upper portion of the tubing hanger; and a tubing annulus valve in the tubing annulus passage for selectively opening and closing the tubing annulus passage.

11. A method of completing a subsea well, comprising:

(a) landing an inner wellhead housing in an outer wellhead housing at an upper end of well, the inner wellhead housing having a bore having an internal grooved profile located therein, the inner wellhead housing extending upward above the outer wellhead housing;

(b) lowering a production tree into engagement with the inner wellhead housing, and landing a lower portion of the tree in the bore of the inner wellhead housing, the tree having an upper portion protruding above the inner wellhead housing after it has landed in the inner wellhead housing;

(c) securing the lower portion of the tree to the grooved profile in the bore of the inner wellhead housing to prevent upward movement of the tree; and (d) installing a string of tubing in the well in a step separate from the production tree.

12. The method according to claim 11, wherein step (c) comprises mounting a hydraulically driven axially movable cam sleeve and a radially movable locking element to the lower portion of the tree, and moving the cam sleeve by hydraulic pressure downward after the tree has engaged the inner wellhead housing to push the locking element outward into engagement with the grooved profile.

13. The method according to claim 11, wherein step (d) comprises:

securing a tubing hanger to the upper end of the string of tubing and landing the tubing hanger in the inner wellhead housing.

14. The method according to claim 11, wherein step (d) comprises:

securing a tubing hanger to the tubing, the tubing hanger having a tubing annulus passage therethrough that communicates with a tubing annulus surrounding the string of tubing, the tubing annulus passage having a tubing annulus valve;

connecting the tubing hanger to a running tool, and with the running tool, moving the tubing annulus valve to an open position; then lowering the tubing into the well with the running tool, and landing the tubing hanger in the inner wellhead housing; then moving the tubing annulus valve to an upper closed position, and applying test pressure from the surface to the tubing annulus passage above the tubing annulus valve while retaining the valve in the upper closed position.

15. The method according to claim 11, wherein step (d) comprises:

securing a tubing hanger to the tubing, the tubing hanger having a tubing annulus passage therethrough that communicates with a tubing annulus surrounding the string of tubing, the tubing annulus passage having a tubing annulus valve;

lowering the tubing into the well and landing the tubing hanger in the inner wellhead housing; then performing step (c); then to obtain access to the tubing annulus, extending an engaging tool from the tree into engagement with the tubing annulus valve to open the tubing annulus valve.

16. The method according to claim 11, wherein steps (a) and (d) are performed using tubular running strings lowered by a well drilling derrick assembly located on a floating platform and step (b) comprises lowering the tree on a lift line deployed from a winch.

17. The method according to claim 11, further comprising providing the tree with a production flow passage extending through the tree, the production flow passage including a laterally extending port leading through a side wall of the tree; and after step (d) flowing well fluid through the tubing and the production flow passage and laterally outward through the port.

\* \* \* \* \*